United States Patent
Ushakov et al.

(10) Patent No.: US 9,009,021 B2
(45) Date of Patent: Apr. 14, 2015

(54) AUTOMATIC TRANSLITERATION OF A RECORD IN A FIRST LANGUAGE TO A WORD IN A SECOND LANGUAGE

(75) Inventors: Maxim Aleksandrovich Ushakov, Moscow (RU); Denis Yurievich Glotov, Moscow (RU)

(73) Assignee: Google Inc., Mountain View, CA (US)

( * ) Notice: Subject to any disclaimer, the term of this patent is extended or adjusted under 35 U.S.C. 154(b) by 315 days.

(21) Appl. No.: 13/522,754

(22) PCT Filed: Jan. 18, 2010

(86) PCT No.: PCT/RU2010/000013
§ 371 (c)(1),
(2), (4) Date: Oct. 8, 2012

(87) PCT Pub. No.: WO2011/087391
PCT Pub. Date: Jul. 21, 2011

(65) Prior Publication Data
US 2013/0035926 A1    Feb. 7, 2013

(51) Int. Cl.
*G06F 17/28* (2006.01)
*G06F 17/20* (2006.01)

(52) U.S. Cl.
CPC ........ *G06F 17/2872* (2013.01); *G06F 17/2863* (2013.01)

(58) Field of Classification Search
CPC ............ G06F 17/2223; G06F 17/2863; G06F 17/2872
See application file for complete search history.

(56) References Cited

U.S. PATENT DOCUMENTS

| | | | |
|---|---|---|---|
| 5,113,342 A * | 5/1992 | Zamora | 704/9 |
| 5,535,119 A * | 7/1996 | Ito et al. | 704/3 |
| 5,640,587 A | 6/1997 | Davis et al. | |
| 6,292,772 B1 * | 9/2001 | Kantrowitz | 704/9 |
| 6,460,015 B1 | 10/2002 | Hetherington et al. | |
| 6,810,374 B2 | 10/2004 | Kang | |
| 7,099,876 B1 | 8/2006 | Hetherington et al. | |
| 7,376,648 B2 | 5/2008 | Johnson | |
| 7,853,444 B2 * | 12/2010 | Wang et al. | 704/2 |
| 8,275,601 B2 * | 9/2012 | Wang et al. | 704/2 |
| 8,612,206 B2 * | 12/2013 | Chalabi et al. | 704/8 |
| 8,655,643 B2 * | 2/2014 | Haddad et al. | 704/3 |
| 2005/0182616 A1 | 8/2005 | Kotipalli | |
| 2005/0216253 A1 | 9/2005 | Brockett | |
| 2006/0112091 A1 | 5/2006 | Chapman et al. | |
| 2006/0143207 A1 | 6/2006 | McQuaid et al. | |
| 2007/0288230 A1 | 12/2007 | Datta | |
| 2007/0288660 A1 * | 12/2007 | Marmor | 709/246 |
| 2008/0097745 A1 | 4/2008 | Bagnato et al. | |
| 2008/0221866 A1 * | 9/2008 | Katragadda et al. | 704/8 |
| 2008/0270111 A1 | 10/2008 | Hanumanthappa | |
| 2009/0012775 A1 | 1/2009 | El Hady et al. | |
| 2009/0132232 A1 * | 5/2009 | Trefler | 704/2 |
| 2012/0016663 A1 * | 1/2012 | Gillam et al. | 704/9 |
| 2012/0239834 A1 * | 9/2012 | Davtchev et al. | 710/67 |

FOREIGN PATENT DOCUMENTS

| | | |
|---|---|---|
| CA | 2630949 A1 | 11/2008 |
| CN | 1193780 A | 9/1998 |
| JP | 2005-092682 A | 4/2005 |
| WO | 01/20435 A2 | 3/2001 |

OTHER PUBLICATIONS

Ayob, M. Z., and A. F. Ismail. "Design of prototype expert system for transliterating Arabic-to-Roman words." Research and Development, 2006. SCOReD 2006. 4th Student Conference on. IEEE, 2006.*
International Search Report and Written Opinion of the ISA, ISA/RU, Moscow, mailed Sep. 23, 2010.

* cited by examiner

*Primary Examiner* — Brian Albertalli
(74) *Attorney, Agent, or Firm* — Remarck Law Group PLC (57) ABSTRACT

This specification describes an innovative method for automatic transliteration of a record in a first language to a word in a second language.

20 Claims, 1 Drawing Sheet

AUTOMATIC TRANSLITERATION OF A RECORD IN A FIRST LANGUAGE TO A WORD IN A SECOND LANGUAGE

CROSS-REFERENCE TO RELATED APPLICATIONS

This application is a 371 U.S. National Stage of International Application No. PCT/RU2010/000013, filed Jan. 18, 2010. The disclosures of the above application are incorporated herein by reference.

TECHNICAL FIELD

The present specification relates to a method for automatic transliteration of records in a first language to relevant words in a second language.

BACKGROUND ART

Transliteration is used in many modern applications and particularly in text applications for mobile telephones, e.g., SMS (Short Message Service), and for network data retrieval, e.g., in Internet search engines.

As a rule, transliteration, i.e. recording the words of one language by means of characters of the other language, is carried out with use of tables of correspondence between letters or more often between sounds, sometimes between syllables in a first language and their representation by letters of a second language. Such methods are described, for example in the U.S. Pat. No. 6,460,015 (published on Oct. 1, 2002), U.S. Pat. No. 6,810,374 (published on Oct. 26, 2004), U.S. Pat. No. 7,376,648 (published on May 20, 2008), in US Patent Applications 2005/0182616 (published on Aug. 18, 2005), 2005/0216253 (published on Sep. 29, 2005), 2006/0143207 (published on Jun. 29, 2006), 2007/0288230 (published on Dec. 13, 2007), 2008/0097745 (published on Apr. 24, 2008), as well as in International Patent Application WO 01/20435 (published on Mar. 22, 2001). A disadvantage of all such methods is failure to unambiguously transliterate the same combinations of letters or sounds in various words.

Chinese Patent 1193780 (published on Sep. 23, 1998) describes a "multi-purpose" method of transliteration. Such multi-purpose nature consists in the fact that initially any language would be translated into Esperanto, and afterwards transliterated with Latin letters. It is clear that the extra stage of representing the text in Esperanto due to obligatory participation of a human would inevitably lengthen the transliteration process, making it more expensive, and introduce extra errors.

The US Patent Application 2008/0270111 (published on Oct. 30, 2008) describes a transliteration method, wherein each vowel and consonant has unique representation in Unicode. In this method various phonetic and pseudo-phonetic transliteration variants are embodied, and generated words with preset information about them are grouped. The resultant variants are analyzed with due consideration for such information, applying preset transliteration rules. A disadvantage of this method lies in that letters are uniquely represented in code equivalent, since various combinations of letters may sound differently, which is not taken into account.

Canadian Patent Application 2630949 (published on Nov. 21, 2008) describes a transliteration method that involves an attempt of replacing chains of letters in a first language with chains of letters in a second language, determination of the replacement probability, and then selection of the most probable replacement based on a preset criterion. A similar method is used in the laid-open Japanese Patent Application 2005-092682 (published on Apr. 7, 2005). However, both methods are rigidly linked to the pair of languages considered in each method (English and Arabic or English and Japanese, respectively) that are poorly flectional. Therefore, they are hardly adaptable to other cases.

SUMMARY

This specification describes an innovative method for automatic transliteration of a record in a first language to a word in a second language. This method includes the following: receiving a sequence of signals, each of which encodes the corresponding character in a first language record to be transliterated, and saving the received signal sequence to a memory;

during stepwise analysis of the signals from the start to the end of the saved signal sequence, finding all transliteration rules for the character being analyzed at the given step or character group starting with the character being analyzed at the given step, in the first language record to be transliterated, by looking up in an appropriate rule base created in advance;

complementing all the transliteration variants obtained at the previous stage with characters of the second language from each transliteration rule found at the given step, thus obtaining at the given step composite variants of transliteration associated with this step or with one of the subsequent steps;

at each step, comparing each of the composite transliteration variants obtained at the given step against starting segments of words in the second language, by looking up in an appropriate base of starting segments of words in the second language, and if a particular transliteration variant associated with the given step matches a starting segment of a word in the second language, retaining this transliteration variant for analysis in subsequent steps;

on completion of the last step of the analysis, accepting at least one transliteration variant in the second language associated with the last step as the transliteration result of the record in the first language; and creating a sequence of signals, each of which encodes the corresponding character in the resulting transliterated word of the second language.

An optional feature of the method is that the received signal sequence is complemented at the start and end with signals corresponding to preset characters, and the first step of analysis is started from the first of the preset characters. The preset characters can be alphabetic or non-alphabetic, and they may be different characters or the very same preset character.

Another optional feature of the method is that the characters used for the record in the first language are selected from the group made up of: alphabetic characters of the first language; non-alphabetic characters, each resembling some alphabetic character of the second language; and non-alphabetic characters that in combination resemble some alphabetic character of the second language.

One more optional feature of the method is that the base of starting segments of words in the second language is created directly during the comparison, from chains no longer than m characters, which chains are obtained from actual words of the second language, and the starting segments of words in the second language are created by imposition of the chains with a shift by one character, wherein m>1 is an integer preselected for the second language; during this process, the occurrence frequency in the second language is determined for each of the chains, and the chains with occurrence frequency below a preset limit are removed.

In the latter case, for each particular transliteration variant associated with the given step and no more than m characters long, its probability is determined by finding the occurrence frequency of the corresponding chain, while for each particular variant that is longer than m characters and is associated with the given step, its probability is determined by multiplying the occurrence frequencies of those involved chains m characters long which belong to the given particular transliteration variant with overlapping upon shifting each subsequent chain m characters long by one character from the start of the given particular transliteration variant; if any of the chains is missing, the variant is discarded.

At the same time, during determination of the probabilities of transliteration variants, the probability calculated at a particular step of analysis is multiplied by a pre-selected weighting factor, of the rule which is used at the given step of analysis to find the transliteration variant One more optional feature of the method is that when the base with starting segments of words in the second language is complemented directly during the comparison, if no variant of transliteration in the second language is found upon completing the analysis for the record in the first language being analyzed, the stepwise analysis of signals from the start to the end of the saved signal sequence can be repeated, and if this particular transliteration variant associated with the given step does not match any starting segment of some word in the second language, this transliteration variant is assigned a tentative occurrence frequency equal to a small preset value, at the same time transliteration variants having higher probability are saved.

Moreover, under the same situation, the number of transliteration variants that can be saved at each step of the analysis shall not exceed a preset number of the transliteration variants ending with the same "m−1" characters of the second language and having higher probability.

Another optional feature of the method is that in the case that the transliteration variant having k chains is compared to a transliteration variant having q chains, where k and q are positive integers, the probabilities of both transliteration variants can be normalized by k and q, respectively, before the comparison, by extracting the k-th or q-th root, respectively, from the corresponding probability.

One more optional feature of the method is that beside the number of chains, the number of rules used in each of the compared variants can also be taken into account.

And at last, one more optional feature of the method is that a logarithmic measure of probability can be used as the probability of a transliteration variant.

The method can be implemented as first described above or with any number of the optional features described above. The steps of the method and all combinations of the optional features, can also be implemented corresponding systems, apparatus, and computer programs recorded on computer storage devices, each configured to perform the steps of the method and any implemented optional features.

BRIEF DESCRIPTION OF THE DRAWINGS

The present disclosure will become more fully understood from the detailed description and the accompanying drawing, wherein.

DETAILED DESCRIPTION

Figure 1:
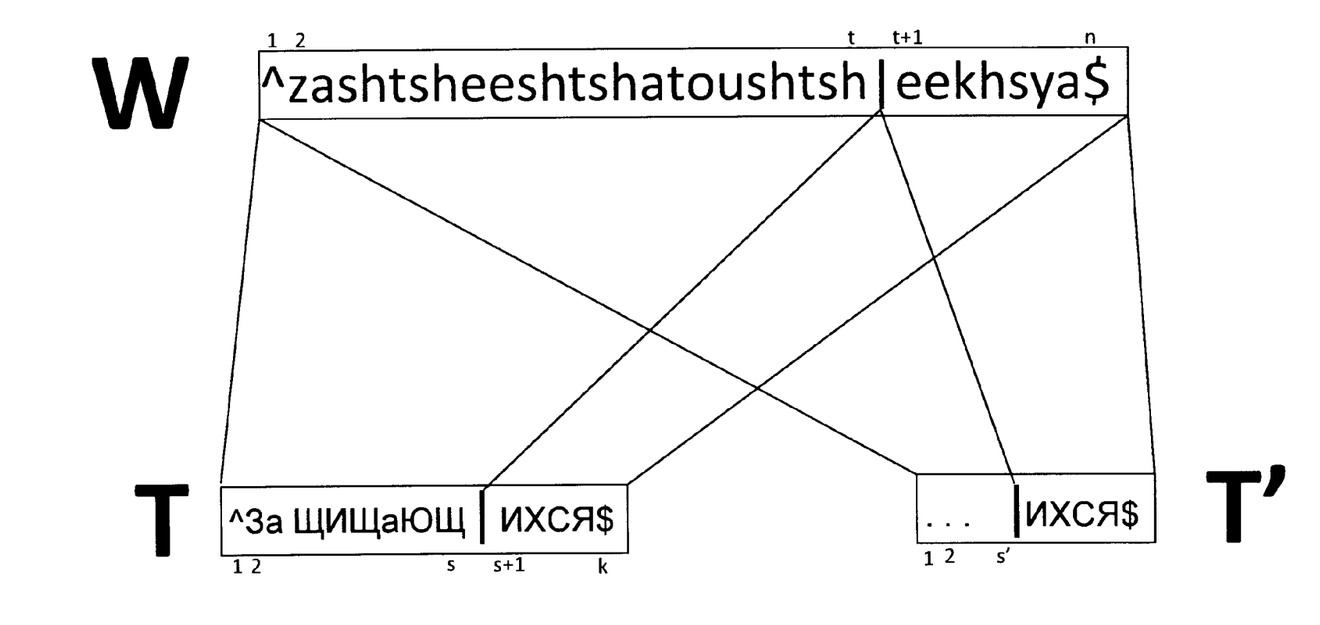
FIG. 1 is an illustration of an example record W and two corresponding variants T and T' according to some aspects of the present disclosure.

This further description describes a detailed exemplary embodiment of the present invention method illustrated by an example of transliterating records with English (Latin) letters to records in Russian (Cyrillic letters). However, the example merely depicts the embodiment of the present invention method, and under no circumstance it shall be treated as a limitation for the method, the scope of which is determined only by the attached formula of invention.

The method actually begins with a preparatory stage, where any public or other databases are used to collect statistics of ways to write certain combinations of letters in one (first) language with letters of another (second) language. For the purpose of transliteration it is necessary to have two sets of data:

(1) Transliteration rules, i.e. a set of rules describing potential transliteration process. For example, «sh→ш». The rules need not be one-for-one (e.g. «s→с», «c→с»), and can even be overlapping (e.g. «s→с», «ch→ч», but «sch→щ»). One of the ways for taking overlaps into account involves assigning weighting coefficients to each rule. So, a transliteration rule represents a set that includes:

a combination, i.e. a set of Latin letters denoting a piece of a record, that, once found in the record, may be replaced according to such a rule;

contents, i.e. a chain of letters of the target language (in our examples—Russian), into which the combination is to be transformed; and     weight, i.e. a rational number identifying significance of the rule among the other rules.

(2) statistics of variants, i.e. statistical information collected from various data bases and used to identify the best candidate—the one we consider the best among others—of the given transliteration in the target language.

For the purpose of this description, "record" means the input of transliteration. It is a word of target language written with the alphabet of the first language. For example, we transliterate "mir"→"мир". "mir" is the (input) record, "мир" is its transliteration, the word of the target language (peace).

From the general point of view, everything seems simple. There is a set of rules (in the case under consideration—a set of presentations from the sequence of Latin letters to the sequence of Russian letters) that identifies the transliteration. Then, it is "only" required to apply each potential rule to each potential sequence to obtain a number of potential transliteration variants. However, this is not practical: for example, a record of the Russian word «zashtsheeshtshayoushtsheekhsya» provides 34 million transliteration variants.

As transliteration is generally ambiguous, a record could be transliterated in many inconsistent ways. For example, Russian is abundant in groups of obviously inconsistent rules:

'y'→'и', 'y'→'ий', 'y'→'ый', 'y'→'ы';
'ch'→'ч', →'sch'→'щ';
. . .

Thus, the record «schy» corresponding to word «щи» has at least 2×4=8 transliteration variants. Therefore, a certain method of selecting a preferable variant is requited. Let us specify function µ for all such spelling variants, and compare $\mu(T_i)$ and $\mu(T_j)$, where $T_i$ and $T_j$ represent comparable spelling variants (i≠j). One might assume that, if T is a dictionary word or the start of certain dictionary word, then µ(T)=1, otherwise, µ(T)=0. However, any dictionary contains a limited number of words (by which we mean combinations of letters) used in the given language. The method is designed even for mistakenly written words. Therefore, a different approach will be used.

Let us select a certain integer number m, and introduce the following definition:

$\mu(T)=\mu_T$, if length of T is less than or equal to m;

$\mu(T)=\mu(T_{[1\ldots m]})\times\mu(T_{[2\ldots m+1]})\times\ldots\times\mu(T_{[k\ldots m+k-1]})$, where length of T is equal to m+k−1, where the designation $T_{[a\ldots b]}$ represents subsequence T in a word from position a to position b inclusive.

Thus, it is required to define all constants $\mu_T$ for complete definition of $\mu(T)$ for any T. Let us assume that $\mu_T$ (for any subsequence T being as long as ≤m) represents a number of subsequences T found as a subsequence of the target language words in the target language analyzed texts taken from a certain source, for example, from Internet web pages.

Quantitative values ($\mu_T$) can always be transformed into a probability by dividing each such value by total sum. In this case, function μ is determined in all variants T of the target language, and expresses similarity degree of T to words from the analyzed source. It can be used as a probability measure of the target language variants.

An m-long piece of the target language word will be referred to as an m-chain (or just a chain). The term m-chain will also be used to refer to the start of a word that is less than m characters long, to be able to identify the probability of a variant having failed to reach a length of m characters. A suitable value for m depends on the language and can be determined heuristically, for example. On the one hand, m should be a small number because total number of chains to be saved in the memory grows like a power m. On the other hand, given too small m, the words with frequently occurring chains can prove preferable to the correct ones. For example, let the correct variant of a record transliteration be «abcdef» for a language with m=3, though, if, for instance, μ[def]<μ[del], then variant «abcdel» will prove preferable.

For Russian, it works well to take m equal to 6. Let us note that when using text from the Internet, not every chain is used. To cut out rare words and obtain more consistent data, a minimum frequency or occurrence threshold is applied.

In comparing two spelling variants and picking the best one, one cannot simply compare probabilities (μ) if such variants differ in length, since the shorter variant has higher probability due to the lower number of multipliers in the product. A special function is used for calculating difference between such lengths and for multiplying probabilities of the shorter variant by mean probability used in creating variants to be compared. Thereby, a normalization of the variants are attained as if their lengths were equal.

For further description, let us assume that each record in the source (first) language is provided at the start and at the end with certain preset characters. The method does not require such additional characters, but they are fairly helpful for illustrating its embodiment. These characters can be either similar or different, either alphabetical or non-alphabetical. The next illustrative example uses character «^» at the start of the record and character «$» at the end of the word. Then, for example, 5-chain [^abcd] denotes sequence of letters at the start of the word, while 5-chain [^who$] denotes individual word «who».

Let us introduce another definition: end of T transliteration variant is represented by the last m−1 letters in T, where m is the size of chains used for this language. Let us also point out that, if variant T is shorter than m letters, its end will be represented by variant T itself. For example, when 6-chains are used for Russian, then the end for variant T=«^Мет ро по» will be represented by т ропо].

It should be noted that hereinafter records of the words in the first language are termed for the sake of simplicity as words, although in the strict sense they do not constitute words.

The following result—presented as a theorem—will be referred to later in this specification.

Theorem.

Let us assume that there are statistics of a language with probability measure μ on the basis of m-chains. Let there be a record W as long as n, and its best (according to μ) transliteration variant T=T(W) as long as k.

For any positive integer t (t≤n), let us consider $W_{[1\ldots t]}$—the initial segment of record W until position t inclusive. $T_{[1\ldots s]}$ is the part of T corresponding to transliteration $W_{[1\ldots t]}$.

Then $T_{[1\ldots s]}$ is the better (according to μ) variant among all other variants with the same end of transliteration $W_{[1\ldots t]}$.

Example.

For Russian language (m=6) and record W=«^zashtsheeshtshayoushtsheekhsya$» the best variant T=«^3aщищающихся$». For t=24, $W_{[1\ldots 24]}$=«^zashtsheeshtshayoushtsh», and corresponding to it there is sub-variant (s=9) $T_{[1\ldots 9]}$=«^3aщищающ». Then $T_{[1\ldots 9]}$ is the best variant among all other variants with the same end «ищающ» of transliteration $W_{[1\ldots 24]}$.

Proof.

Let us assume that for $W_{[1\ldots t]}$ there is another variant $T'_{[1\ldots s']}$ with the same end, and $\mu(T'_{[1\ldots s']})>\mu(T_{[1\ldots s]})$. That is, variant $T'_{[1\ldots s']}$ is better than $T_{[1\ldots s]}$.

Let us develop T' as concatenation $T'_{[1\ldots s']}+T_{[s+1\ldots k]}$. Then, T' will also constitute a variant of transliteration W as a fusion of word W transliteration before position t and after it.

Then, considering that $T_{[1\ldots s]}$ and $T'_{[1\ldots s']}$ under hypothesis have the same ends, we obtain:

$$\mu(T)=\mu(T_{[1\ldots s]})\times\mu(T_{[s-m+1\ldots s+1]})\times$$
$$\mu(T_{[s-m+2\ldots s+2]})\times\ldots\times\mu(T_{[s\ldots s+m]})\times$$
$$\mu(T_{[s+1\ldots k]}),$$

$$\mu(T')=\mu(T'_{[1\ldots s']})\times\mu(T_{[s-m+1\ldots s+1]})\times$$
$$\mu(T_{[s-m+2\ldots s+2]})\times\ldots\times\mu(T_{[s\ldots s+m]})\times$$
$$\mu(T_{[s+1\ldots k]})$$

Note that if s<m, s'<m or s+m>k, certain multipliers will disappear.

Since, by hypothesis, the first element of the product for μ(T') is larger than the first element for μ(T), and the rest of them are equal, then μ(T')>μ(T). We have a contradiction with the hypothesis that T is the best variant for W.

It should be noted that this result is true even if all the words are short (having length less than m).

Thus, the algorithm alone as embodied by the present method is fairly simple. As an option in the illustrative example, the record in the first language has signs «^» and «$» added to indicate the start and the end of this record. Then, the record will undergo stage-by-stage analysis from the first to the last letter (including the above added signs). In reviewing the position of each subsequent letter, all suitable rules will be applied starting from the current position, which results in a number of transliteration variants at the given stage of the analysis. Then, the rules will be applied to previously obtained variants, and eventually the variants of the entire word will be obtained.

At each stage, only variants with unique ends will be retained. If some variants have the same ends, the most probable variant will be retained. (In the event that M of the most probable resultant variants are required, then the largest M of the best variants with the same end shall, be retained). We are entitled to this according to the main theorem inference saying that the best variants will arise out of the best sub-variants (among those having the same ends).

Let us point out that sub-variants having different ends are not compared with one another. Let us assume that variant «abc» is better than variant «aBC», but the application of the following rule may make variant «abcd» inferior to variant «aBCd». Therefore, if the ends are different, we retain all the variants in the hope that some of them can give the best estimate.

Retaining only the best variants at each stage will make our working set as small as required, and shall refrain us from iteration at each possible transliteration.

Each time, when we apply a certain rule to a certain variant, we update its probability according to the chains that we added, and multiply it by weight of the rule.

Example.

Let m=6 for Russian; and let the input record W= «^metropol$».

Assume that after transliteration «^metropo», we obtain variant {^ м е т р о п о}. One of the rules that corresponds to the last letter «l» is rule R: «l» → «ль». Then, we add { ль }, thus obtaining «^Ме т р о п о ль», and have to recalculate its frequency multiplying it by μ[прот о л]×μ[роп о льarib]× weight (R).

Finally, we use the most frequent variant or variants that we obtained at the final stage, and remove signs «^» and «$».

Now, let us consider implementation of this algorithm in the present method.

As this method is designed for automatic transliteration, all the records to be transliterated are made suitable for computer processing. Namely, the records are coded in any acceptable code (e.g. ASCII, KOI-8, Unicode etc.) and transformed into appropriate signals to be transmitted through communication lines or recorded to a machine-readable medium. A sequence of such signals, with the help of which the first language record to be transliterated was coded as a sequence of characters, will be received for its further processing in a duly programmed data processing unit. The latter can be a personal computer (PC), personal digital assistant (PDA), mobile telephone, server or any other device that can be provided with a program written according to a method stated in the present description. This received sequence of signals will optionally be supplemented at its start and end with signals corresponding to preset characters. As already noted above, the characters can be similar or different, alphabetic or non-alphabetic. In the latter case, for example, all characters of a record to be transliterated can be lower-case characters, while the start and end of such word can be supplemented with capital letters. The method will be performed on this data.

To do this, a first character will initially be selected, and its appropriate transliteration rule will be searched. Normally, there are rules that transliterate characters designating start and end of a record respectively into themselves. However, a rule can be introduced that will be applicable to only the record character, should it rank first. For example, ^ i → ^й. The last characters will be treated similarly, e.g. yov$→ев$. Then, the second character (i.e. the first letter of the record) will be chosen, and transliteration rules corresponding to it will be searched. Each found rule, i.e. corresponding character or a chain of corresponding characters (if a character of the source language can be transliterated by means of, say, two characters of the target language—e.g. «l» → «ль» ) will be used to supplement each transliteration rule found in the previous iteration. In the given case, a non-alphabetic character, introduced at the record start and being transliterated into itself, will be supplemented with characters of the second language from each transliteration rule found at this stage for the first character of the source language. In principle, a record in the first language can use characters selected from a group made up of, for example, the following: alphabetic characters of the first language; non-alphabetic characters, each of which bears resemblance to one of alphabetic characters in the second language (for example, figure «3» can be used to record Russian letter «з» instead of Latin letter «z» ); non-alphabetic characters, the combination of which bears resemblance to one of alphabetic characters in the second language (for example, a pair of characters «/\» (forward and backward slash characters) could be used to record Russian letter «л» instead of Latin letter «l» ).

The next stage of the analysis involves picking up the second letter of the record being transliterated (i.e. the third character, should such record start and end be supplemented with non-alphabetic characters), and searching transliteration rules for such second letter. All thus found characters of the second language will supplement the chains previously made up of the second language characters, i.e. the chains of the record starting non-alphabetic character supplemented with the second language appropriate characters found for the first letter of the record in the source (first) language.

Let us also point out that the rules, are applicable not only to individual characters of the record, but to groups of characters starting with the analyzed character. In this case, engendered variants fall into a stage preceding another stage that will involve consideration of a record character following those transformed by the rule.

These analysis stages are repeated until no more characters of the record being transliterated remain, i.e. in the present case, to a non-alphabetic character added to the end of such record. At each stage of analysis, each chain already made up at the previous stage of the second (target) language characters will be supplemented with characters found at the present stage. Thereafter, each of the resulting chains of target language characters are compared by reference to the appropriate base of initial segments with initial segments of the second language words. Such a comparison process involves picking-up, at each stage, the variants having higher occurrence frequency as compared with other variants having the same ends out of many transliteration variants found in the course of the above comparison:

1. We parse the input record from the beginning to the end character-by-character.

2. At each stage, we find all rules matching the input record from the current character and on.

3. All chains already made-up at previous stage are supplemented with the contents of the found rules.

4. By referring to the base of initial segments of the second language words, we assign the probability of the variant. If no initial segment equal to the variant found, the variant is dropped.

5. The variants with same endings (same last m−1 characters) and on the same stage, are compared by their probability. The higher probability variant is saved, others dropped.

In principle, the base of the second language initial segments can be made up beforehand using a data collection approximating all words in the second language. However, this would require a very voluminous database. Therefore, it is more efficient to follow another way, and to form this base of initial segments of the second language words just in the course of the above comparison with initial segments of real words in the second language. Such a base of initial segments of the second language words will be compiled from real words in the second language, while initial segments of the second language words will be made up by mapping such chains with a single-character shift. Probability of each specific transliteration variant associated with the above stage and not exceeding m characters in length will represent occurrence frequency of an appropriate chain, while the probability of each specific transliteration variant associated with the above stage and exceeding m characters in length will be found through multiplying occurrence frequencies of m-character long chains contained in the above-specified transliteration variant with overlapping due to shift of each next m-character long chains by one character from the start of the above specific transliteration variant. For example, for variant «абвгдеж», the previously found occurrence frequencies for chains «абвгд», «бвгде» and «вгдеж» will be multiplied. The resultant product will constitute the target probability for variant «абвгдеж». Each of the above chains having occurrence frequency in the second language lower then a preset limit can initially be removed from the chains' database; and if a certain chain is absent, the corresponding transliteration variant may be discarded.

In certain cases, it seems expedient, whilst calculating the probabilities of transliteration variants, to multiply the probability calculated at a specific stage of analysis by a previously selected weight coefficient assigned to the rule used at the above analysis stage to find transliteration variant. This helps to estimate variants based not only on its characters, but also on rules that generated the variant. It is useful in some cases, when exclusion of the above variants may result in failure to find transliteration for the entire record in the source language, since without assigning such a small probability, transliteration results obtained in the previous iterations may be discarded.

In the case when, on completion of the last stage of analysis, no transliteration variant in the second language for the analyzed record in the first language has been found, the above stage-by-stage analysis of signals will be repeated from the start to the end of the stored signal sequence, and where there is no coincidence of the above stage-specific transliteration variant with any initial segment of the word in the second language, such transliteration variant will be assigned fake occurrence frequency with preset low value. In this case, retained at each analysis stage will be no more than a preset number of transliteration variants having the same end of m−1 characters of the second language, and a frequency bring higher then the rest of the variants with the same ends of m−1 characters. This would be helpful for the transliteration into such languages as Arabic, where the same letter appearance can vary depending on its position at the start, middle or end of a word. If the target language has no such peculiarities, the most probable variant will be chosen from transliteration variants with similar latest m−1 characters of the target language.

In the case of comparing a transliteration variant consisting of k aforementioned chains and rules with a transliteration variant consisting of q aforementioned chains and rules, where k and q are positive integers, the probabilities of both transliteration variants will be normalized prior to comparison in terms of k or q, respectively, by extraction of k-th or q-th root, respectively, of the appropriate probability values.

For example, with initial record «^shkola$» at the third stage, we have variant $V_1$=«^cx» consisting of a single chain and three rules: ^→^, s→c, h→x, and variant $V_2$=«^ш» consisting of a single chain and two rules: ^→^, sh→ш. In this case, not the first root, i.e. not the probability values themselves (comparison frequency) shall be compared, but respectively, the fourth root of the occurrence frequency of variant $V_1$ and the third root of the occurrence frequency of variant $V_2$.

One may point out that it is expedient to use the logarithmic measure of frequency of occurrence of chains of the second language characters as a probability of a fairly small value due to huge numbers of words relied upon in creating the above base of rules and base of initial segments.

When the processing of the entire record in the source language to be transliterated is completed through multiple stages as described above, the final most probable result can be treated as a target transliteration in the target language. This is followed with generation of a signals sequence corresponding to the second language transliterated word encoding that, for example, can be transmitted over communication lines or written in a respective memory.

The transliteration examples in accordance with the method described above are shown below. These examples represent the variants attributed to each transliteration stage and left (not discarded) for analysis at subsequent stages.

Example I

Transliteration of Record «Olga»

| End | Probability | Transliterated part | Applied rules (with weights) |
|---|---|---|---|
| 1: ^|olga$ | | | |
| [^] | 1 | "^" | → |

At the first stage, initial signal was transliterated into itself.
  2: ^o|lga$

| End | Probability | Transliterated part | Applied rules (with weights) |
|---|---|---|---|
| [^o] | 0.0198769 | "^o" | ^→^<br>o→o |

3: ^o|lga$

| End | Probability | Transliterated part | Applied rules (with weights) |
|---|---|---|---|
| [^ол] | 0.000146119 | "^ол" | ^→^<br>o→o<br>l→л |
| [^оль] | 1.56053e−06 | "^оль" | ^→^<br>o→o<br>l→ль w: 0.05 |

At the third stage, the second letter of the record was transliterated in two ways giving rise to two variants. Since their ends differ, according to the theorem, no attempt at comparing and discarding has been made.
  4: ^o|g|a$

| End | Probability | Transliterated part | Applied rules (with weights) |
|---|---|---|---|
| [^олг] | 4.04846e−07 | "^олг" | ^→^<br>o→o<br>l→л<br>g→г |
| [^олж] | 1.74308e−09 | "^олж" | ^→^<br>o→o<br>l→л<br>g→ж w: 0.01 |
| [^ольг] | 1.33855e−06 | "^ольг" | ^→^<br>o→o<br>l→ль w: 0.05<br>g→г |

At the fourth stage, next letter g, once also given two-fold transliteration, has engendered four variants. But, as chain [^олж] has zero probability, its variant has been discarded.

5: ˆolga|$

| | | | |
|---|---|---|---|
| [ˆoлгa] | 9.65577e−08 | "ˆолга" | ˆ→ˆ<br>o→о<br>l→л<br>g→г<br>a→а |
| [ˆoлжa] | 3.8423e−10 | "ˆолжа" | ˆ→ˆ<br>o→о<br>l→л<br>g→ж  w: 0.01<br>a→а |
| [oльгa] | 1.11676e−06 | "ˆольга" | ˆ→ˆ<br>o→о<br>l→ль  w: 0.05<br>g→г<br>a→а |

6: ˆolga$

| | | | |
|---|---|---|---|
| [льгa$] | 2.55749e−11 | "ˆольга$" | ˆ→ˆ<br>o→о<br>l→ль  w: 0.05<br>g→г<br>a→а<br>$→$ |
| [oлгa$] | 3.4578e−08 | "ˆолга$" | ˆ→ˆ<br>o→о<br>l→л<br>g→г<br>a→а<br>$→$ |

Result: ольга   Example II

Transliteration of Record «Shashka»

This example illustrates application of rules assigned to higher-order stages than those, at which it was applied.

For example, the first character s and subsequent characters were analyzed at the second stage. One of the rules, sh→ш, affected the record second and third positions at once. Therefore, variant «ˆш» engendered by them has been referred at once to the third stage.

1: ˆ|shashka$

| End | Probability | Transliterated part | Applied rules (with weights) |
|---|---|---|---|
| [ˆ] | 1 | ˆ | ˆ→ˆ |

2: ˆs|hashka$

| | | | |
|---|---|---|---|
| [ˆз] | 8.10924e−05 | ˆз | ˆ→ˆ<br>s→з  w: 0.01 |
| [ˆc] | 0.0309413 | ˆc | ˆ→ˆ<br>s→c |
| [ˆCъ] | 5.14555e−05 | ˆCъ | ˆ→ˆ<br>s→Cъ |
| [ˆCъ] | 4.51423e−07 | ˆCъ | ˆ→ˆ<br>s→Cъ  w: 0.1 |
| [ˆш] | 1.80712e−06 | ˆш | ˆ→ˆ<br>s→ш  w: 0.001 |

3: ˆsh|ashka$

| | | | |
|---|---|---|---|
| [ˆзx] | 7.64281e−09 | ˆзx | ˆ→ˆ<br>s→з  w: 0.01<br>h→x |
| [ˆcx] | 9.61574e−05 | ˆcx | ˆ→ˆ<br>s→c |

| | | | |
|---|---|---|---|
| [ˆш] | 0.00180712 | ˆш | ˆ→ˆ<br>sh→ш |
| [ˆшx] | 3.17676e−09 | ˆшx | ˆ→ˆ<br>s→ш  w: 0.001<br>h→x |
| [ˆщ] | 5.4019e−06 | ˆщ | ˆ→ˆ<br>sh→щ  w: 0.01 |

4: ˆsha|shka$

| | | | |
|---|---|---|---|
| [ˆзxa] | 3.72714e−10 | ˆзxa | ˆ→ˆ<br>s→з  w: 0.01<br>h→x<br>a→а |
| [ˆcxa] | 9.58236e−08 | ˆcxa | ˆ→ˆ<br>s→c<br>h→x<br>a→а |
| [ˆшa] | 0.000238168 | ˆшa | ˆ→ˆ<br>sh→ш<br>a→а |
| [ˆшxa] | 1.97438e−11 | ˆшxa | ˆ→ˆ<br>s→ш  w: 0.001<br>h→x<br>a→а |
| [ˆшя] | 2.59001e−09 | ˆшя | ˆ→ˆ<br>sh→ш<br>a→я  w: 0.001 |
| [ˆщa] | 1.10777e−07 | ˆщa | ˆ→ˆ<br>sh→щ  w: 0.01<br>a→а |
| [ˆщя] | 2.93584e−11 | ˆщя | ˆ→ˆ<br>sh→щ  w: 0.01<br>a→я  w: 0.001 |

5: ˆshas|hka$

| | | | |
|---|---|---|---|
| [ˆшac] | 4.24794e−06 | ˆшac | ˆ→ˆ<br>sh→ш<br>a→а<br>s→c |
| [ˆшaш] | 6.59954e−09 | ˆшaш | ˆ→ˆ<br>sh→ш<br>a→а<br>s→ш  w: 0.001 |
| [ˆшяc] | 2.01154e−11 | ˆшяc | ˆ→ˆ<br>sh→ш<br>a→я  w: 0.001<br>s→c |
| [ˆщяш] | 6.9434e−13 | ˆщяш | ˆ→ˆ<br>sh→ш<br>a→я  w: 0.001<br>s→ш  w: 0.001 |
| [ˆщaз] | 2.41509e−11 | ˆщaз | ˆ→ˆ<br>sh→щ  w: 0.01<br>a→а<br>s→з  w: 0.01 |
| [ˆщac] | 4.47293e−08 | ˆщac | ˆ→ˆ<br>sh→щ  w: 0.01<br>a→а<br>s→c |
| [ˆщaш] | 1.63144e−12 | ˆщaш | ˆ→ˆ<br>sh→щ  w: 0.01<br>a→а<br>s→ш  w: 0.01 |
| [ˆщэ] | 1.94088e−15 | ˆщэ | ˆ→ˆ<br>sh→щ  w: 0.01<br>a→я  w: 0.001<br>s→з  w: 0.01 |
| [ˆщяc] | 7.63459e−13 | ˆщяc | ˆ→ˆ<br>sh→щ  w: 0.01<br>a→я  w: 0.001<br>s→c |

-continued

| | | | |
|---|---|---|---|
| [ ^щяш ] | 1.06198e−15 | ^щяш | ^→^<br>sh→щ w: 0.01<br>a→я w: 0.001<br>s→щ w: 0.001 |

6: ^shash|ka$

| | | | |
|---|---|---|---|
| [ ^шаш ] | 6.59954e−06 | ^шаш | ^→^<br>sh→ш<br>a→a<br>sh→ш |
| [ ^шащ ] | 2.84768e−09 | ^шащ | ^→^<br>sh→ш<br>a→a<br>sh→щ w: 0.01 |
| [ ^шяш ] | 6.9434e−10 | ^шяш | ^→^<br>sh→ш<br>a→я w: 0.001<br>sh→ш |
| [ ^шящ ] | 4.95191e−12 | ^шящ | ^→^<br>sh→ш<br>a→я w: 0.001<br>sh→щ w: 0.01 |
| [ ^щаш ] | 1.63144e−09 | ^щаш | ^→^<br>sh→щ w: 0.01<br>a→a<br>sh→ш |
| [ ^щаш ] | 8.60848e−11 | ^щаш | ^→^<br>sh→щ w: 0.01<br>a→a<br>sh→ш |
| [ ^щяш ] | 1.06198e−12 | ^щяш | ^→^<br>sh→щ w: 0.01<br>a→я w: 0.001<br>sh→ш |
| [ ^щяш ] | 8.05361e−14 | ^щяш | ^→^<br>sh→щ w: 0.01<br>a→я w: 0.001<br>s→щ w: 0.01 |

7: ^shashk|a$

| | | | |
|---|---|---|---|
| [ ^шаш к] | 2.52467e−06 | ^шаш к | ^→^<br>sh→ш<br>a→a<br>sh→ш<br>k→к |

8: ^shashka|$

| | | | |
|---|---|---|---|
| [ ^шаш ка] | 5.38716e−07 | ^ ка | ^→^<br>sh→ш<br>a→a<br>sh→ш<br>k→к<br>a→a |

9: ^shashka$|

| | | | |
|---|---|---|---|
| [a^ш ка$] | 1.03159e−13 | ^шаш ка$ | ^→^<br>sh→ш<br>a→a<br>sh→ш<br>k→к<br>aa<br>$→$ |

Result: <u>шашка</u>

Example III

Transliteration of Record «Podzol»

This example illustrates repeated transliteration process due to the absence of a result following the first passage. Indeed, the probability of chain [одзол$] is zero, and expected result «подзол» was discarded at the last stage. The other variants were also discarded at various stages for the same reason.

The second time, the variants that failed to coincide with any initial segments of words in the second language, were assigned low probability 1e-10. Since no variants have been discarded in the transliteration process, their total number is large, but the result was achieved.

1: ^|podzol$

| End | Probability | Transliterated part | Applied rules (with weights) |
|---|---|---|---|
| [^] | 1 | ^ | ^→^ |

2: ^p|odzol$

| | | | |
|---|---|---|---|
| [ ^п ] | 0.0356523 | ^п | ^→^<br>p→п |
| [ ^p ] | 1.40238e−07 | ^p | ^→^<br>p→p(1e−05) |

3: ^po|dzol$

| | | | |
|---|---|---|---|
| [ ^п o] | 0.014841 | ^п o | ^→^<br>p→п<br>o→o |
| [ ^po] | 1.82471e−08 | ^po | ^→^<br>p→p(1e−05)<br>o→o |

4: ^pod|zol$

| | | | |
|---|---|---|---|
| [ ^под ] | 0.00224693 | ^под | ^→^<br>p→п<br>o→o<br>d→д |
| [ ^подъ ] | 5.03591e−06 | ^подъ | ^→^<br>p→п<br>o→o<br>d→дъ (0.2) |
| [ ^подъ ] | 8.71406e−08 | ^подъ | ^→^<br>p→п<br>o→o<br>d→дъ (0.2) |
| [ ^po д ] | 2.09531e−09 | ^po д | ^→^<br>p→p(1e−05)<br>o→o<br>d→д |
| [ ^родъ ] | 4.23415e−14 | ^родъ | ^→^<br>p→p(1e−05)<br>o→o<br>d→дъ (0.2) |
| [ ^родъ ] | 2e−16 | ^родъ | ^→^<br>p→p(1e−05)<br>o→o<br>d→дъ (0.2) |

5: ˆpodz|ol$

| | | | |
|---|---|---|---|
| [ˆ подж ] | 1.52488e−07 | ˆподж | ˆ→ˆ<br>p→п<br>o→o<br>d→д<br>z→ж (0.03) |
| [ˆ подз ] | 1.50648e−05 | ˆподз | ˆ→ˆ<br>p→п<br>o→o<br>d→д<br>z→з |
| [ˆ подц ] | 2.20269e−08 | ˆподц | ˆ→ˆ<br>p→п<br>o→o<br>d→д<br>z→ц (0.05) |
| [ˆ ро дж ] | 5.94019e−13 | ˆро дж | ˆ→ˆ<br>p→p(1e−05)<br>o→o<br>d→д<br>z→ж (0.03) |
| [ˆ ро дз ] | 9.18225e−13 | ˆро дз | ˆ→ˆ<br>p→p(1e−05)<br>o→o<br>d→д<br>z→з |
| [ˆ ро дц ] | 5e−17 | ˆро дц | ˆ→ˆ<br>p→p(1e−05)<br>o→o<br>d→д<br>z→ц (0.05) |
| [о дзь ] | 4e−22 | ˆп о дзь | ˆ→ˆ<br>p→п<br>o→o<br>d→дь (0.2)<br>z→зь (0,2) |
| [о дзь ] | 4e−22 | ˆп о дзь | ˆ→ˆ<br>p→п<br>o→o<br>d→дь (0.2)<br>z→зь (0.2) |
| [п о дзь ] | 2e−11 | ˆп о дзь | ˆ→ˆ<br>p→п<br>o→o<br>d→д<br>z→зь (0.2) |
| [п о дъж ] | 6e−13 | ˆп о дъж | ˆ→ˆ<br>p→п<br>o→o<br>d→дь (0.2)<br>z→ж (0.03) |
| [п о дъз ] | 2e−11 | ˆп о дъз | ˆ→ˆ<br>p→п<br>o→o<br>d→дь (0.2)<br>z→з |
| [п о дъц ] | 1e−12 | ˆп о дъц | ˆ→ˆ<br>p→п<br>o→o<br>d→дь (0.2)<br>z→ц (0.05) |
| [п о дъж ] | 6e−13 | ˆп о дъж | ˆ→ˆ<br>p→п<br>o→o<br>d→дь (0.2)<br>z→ж (0.03) |
| [п о дъз ] | 2e−11 | ˆп о дъз | ˆ→ˆ<br>p→п<br>o→o<br>d→дь (0.2)<br>z→з |
| [п о дъц ] | 1e−12 | ˆп о дъц | ˆ→ˆ<br>p→п<br>o→o<br>d→дь (0.2)<br>z→ц (0.05) |
| [ро дъз ] | 2e−16 | ˆро дъз | ˆ→ˆ<br>p→p(1e−05)<br>o→o<br>d→д<br>z→з (0,2) |

-continued

| | | | |
|---|---|---|---|
| [ро дъж ] | 6e−18 | ˆро дъж | d→д<br>z→зь (0,2)<br>ˆ→ˆ<br>p→p(1e−05)<br>o→o |
| [ро дъз ] | 2e−16 | ˆро дъз | d→дь (0.2)<br>z→ж (0.03)<br>ˆ→ˆ<br>p→p(1e−05)<br>o→o |
| [ро дъц ] | 1e−17 | ˆро дъц | d→дь (0.2)<br>z→з<br>ˆ→ˆ<br>p→p(1e−05)<br>o→o |
| [ро дъж ] | 6e−18 | ˆро дъж | d→дь (0.2)<br>z→ц (0.05)<br>ˆ→ˆ<br>p→p(1e−05)<br>o→o |
| [ро дъз ] | 2e−16 | ˆро дъз | d→дь (0.2)<br>z→ж (0.03)<br>ˆ→ˆ<br>p→p(1e−05)<br>o→o |
| [ро дъц ] | 1e−17 | ˆро дъц | d→дь (0.2)<br>z→з<br>ˆ→ˆ<br>p→p(1e−05)<br>o→o<br>d→дь (0.2)<br>z→ц (0.05) |

6: ˆpodzo|l$

| | | | |
|---|---|---|---|
| [ дъзь o] | 4e−32 | ˆподъзьо | ˆ→ˆ<br>p→п<br>o→o<br>d→дь (0.2)<br>z→зь (0.2) |
| [дъзь о] | 4e−32 | ˆподъзьо | ˆ→ˆ<br>p→п<br>o→o<br>d→дь (0.2)<br>z→зь (0.2) |
| [о дзь о] | 2e−21 | ˆподъзьо | ˆ→ˆ<br>p→п<br>o→o<br>d→д<br>z→зь (0.2) |
| [о дъж о] | 6e−23 | ˆп о дъж о | ˆ→ˆ<br>p→п<br>o→o<br>d→дь (0.2)<br>z→ж (0.03) |
| [о дъз о] | 2e−21 | ˆп о дъз о | ˆ→ˆ<br>p→п<br>o→o<br>d→дь (0.2)<br>z→з |
| [о дъц о] | 1e−22 | ˆп о дъц о | ˆ→ˆ<br>p→п<br>o→o<br>d→дь (0.2)<br>z→ц (0.05) |
| [о дъж о] | 6e−23 | ˆп о дъж о | ˆ→ˆ<br>p→п<br>o→o<br>d→дь (0.2)<br>z→ж (0.03)<br>o→o |

| Input | Probability | Output | Transformations |
|---|---|---|---|
| [одзо] | 2e-21 | ^подзо | ^→^; p→п; o→о; d→дь (0.2); z→з |
| [одцо] | 1e-22 | ^подцо | ^→^; p→п; o→о; d→дь (0.2); z→ц (0.05) |
| [поджо] | 2.73535e-08 | ^поджо | ^→^; p→п; o→о; d→д; z→ж (0.03) |
| [подзо] | 7.79656e-07 | ^подзо | ^→^; p→п; o→о; d→д; z→з |
| [подцо] | 5e-12 | ^подцо | ^→^; p→п; o→о; d→д; z→ц (0.05) |
| [роджо] | 3e-17 | ^роджо | ^→^; p→p (1e-05); o→о; d→д; z→ж (0.03) |
| [родзо] | 1e-15 | ^родзо | ^→^; p→p (1e-05); o→о; d→д; z→з |
| [родцо] | 5e-17 | ^родцо | ^→^; p→p (1e-05); o→о; d→д; z→ц (0.05); o→о |

7: ^podzoll$

| Input | Probability | Output | Transformations |
|---|---|---|---|
| [джоль] | 1.36767e-29 | ^поджоль | ^→^; p→п; o→о; d→д; z→ж (0.03); o→о; l→ль (0.05) |
| [дзоль] | 3.11498e-25 | ^подзоль | ^→^; p→п; o→о; d→д; z→з; o→о; l→ль (0.05) |
| [дзьол] | 2e-31 | ^подзьол | ^→^; p→п; o→о; d→д; z→зь (0.2); o→о; l→л |
| [дцоль] | 2.5e-33 | ^подцоль | ^→^; p→п; o→о; d→д; z→ц (0.05); o→о; l→ль (0.05) |
| [джол] | 6e-33 | ^подъжол | ^→^; p→п; o→о; d→дъ (0.2); z→ж (0.03); o→о; l→л |
| [дзол] | 2e-31 | ^подъзол | ^→^; p→п; o→о; d→дъ (0.2); z→з; o→о; l→л |
| [дцол] | 1e-32 | ^подъцол | ^→^; p→п; o→о; d→дъ (0.2); z→ц (0.05); o→о; l→л |
| [дьжол] | 6e-33 | ^подьжол | ^→^; p→п; o→о; d→дь (0.2); z→ж (0.03); o→о; l→л |
| [дьзол] | 2e-31 | ^подьзол | ^→^; p→п; o→о; d→дь (0.2); z→з; o→о; l→л |
| [дьцол] | 1e-32 | ^подьцол | ^→^; p→п; o→о; d→дь (0.2); z→ц (0.05); o→о; l→л |
| [зьоль] | 1e-42 | ^подзьоль | ^→^; p→п; o→о; d→д; z→зь (0.2); o→о; l→ль (0.05) |
| [оджол] | 2.73535e-18 | ^поджол | ^→^; p→п; o→о; d→д; z→ж (0.03); o→о; l→л |
| [одзол] | 6.22996e-14 | ^подзол | ^→^; p→п; o→о; d→д; z→з; o→о; l→л |
| [одцол] | 5e-22 | ^подцол | ^→^; p→п; o→о; d→д; z→ц (0.05); o→о; l→л |
| [ъжоль] | 3e-44 | ^подъжоль | ^→^; p→п; o→о; d→дъ (0.2); z→ж (0.03); o→о; l→ль (0.05) |

-continued

| | | | |
|---|---|---|---|
| [ъзоль] | 1e–42 | ^подъзоль | ^→^<br>p→п<br>o→o<br>d→дъ (0.2)<br>z→з<br>o→o<br>l→ль (0.05) |
| [ъзьол] | 4e–42 | ^подъзьол | ^→^<br>p→п<br>o→o<br>d→дъ (0.2)<br>z→зь (0.2)<br>o→o<br>l→л |
| [ъцоль] | 5e–44 | ^подъцоль | ^→^<br>p→п<br>o→o<br>d→дъ (0.2)<br>z→ц (0.05)<br>o→o<br>l→ль (0.05) |
| [ъжоль] | 3e–44 | ^подъжоль | ^→^<br>p→п<br>o→o<br>d→дъ (0.2)<br>z→ж (0.03)<br>o→o<br>l→ль (0.05) |
| [ьзоль] | 1e–42 | ^подьзоль | ^→^<br>p→п<br>o→o<br>d→дь (0.2)<br>z→з<br>o→o<br>l→ль (0.05) |
| [ьзьол] | 4e–42 | ^подьзьол | ^→^<br>p→п<br>o→o<br>d→дь (0.2)<br>z→зь (0.2)<br>o→o<br>l→л |
| [ьцоль] | 5e–44 | ^подьцоль | ^→^<br>p→п<br>o→o<br>d→дь (0.2)<br>z→ц (0.05)<br>o→o<br>l→ль (0.05) |

8: ^podzol$|

| | | | |
|---|---|---|---|
| [джол $] | 2.73535e–28 | ^поджол $ | ^→^<br>p→п<br>o→o<br>d→д<br>z→ж (0.03)<br>o→o<br>l→л<br>$→$ |
| [дзол $] | 6.22996e–24 | ^подзол $ | ^→^<br>p→п<br>o→o<br>d→д<br>z→з<br>o→o<br>l→л<br>$→$ |
| [дцол $] | 5e–32 | ^подцол $ | ^→^<br>p→п<br>o→o<br>d→д<br>z→ц (0.05)<br>o→o<br>l→л<br>$→$ |

-continued

| | | | |
|---|---|---|---|
| [жоль $] | 1.36767e–39 | ^поджоль $ | ^→^<br>p→п<br>o→o<br>d→д<br>z→ж (0.03)<br>o→o<br>l→ль (0.05)<br>$→$ |
| [золь $] | 3.11498e–35 | ^подзоль $ | ^→^<br>p→п<br>o→o<br>d→д<br>z→з<br>o→o<br>l→ль (0.05)<br>$→$ |
| [зьол $] | 2e–41 | ^подзьол $ | ^→^<br>p→п<br>o→o<br>d→д<br>z→зь (0.2)<br>o→o<br>l→л<br>$→$ |
| [цоль $] | 2.5e–43 | ^подцоль $ | ^→^<br>p→п<br>o→o<br>d→д<br>z→ц (0.05)<br>o→o<br>l→ль (0.05)<br>$→$ |
| [ъжол $] | 6e–43 | ^подъжол $ | ^→^<br>p→п<br>o→o<br>d→дъ (0.2)<br>z→ж (0.03)<br>o→o<br>l→л<br>$→$ |
| [ъзол $] | 2e–41 | ^подъзол $ | ^→^<br>p→п<br>o→o<br>d→дъ (0.2)<br>z→з<br>o→o<br>l→л<br>$→$ |
| [ъцол $] | 1e–42 | ^подъцол $ | ^→^<br>p→п<br>o→o<br>d→дъ (0.2)<br>z→ц (0.05)<br>o→o<br>l→л<br>$→$ |
| [ьжол $] | 6e–43 | ^подьжол $ | ^→^<br>p→п<br>o→o<br>d→дь (0.2)<br>z→ж (0.03)<br>o→o<br>l→л<br>$→$ |
| [ьзол $] | 2e–41 | ^подьзол $ | ^→^<br>p→п<br>o→o<br>d→дь (0.2)<br>z→з<br>o→o<br>l→л<br>$→$ |
| [ьоль $] | 1e–52 | ^подзьоль $ | ^→^<br>p→п<br>o→o<br>d→д<br>z→зь (0.2)<br>o→o<br>l→ль (0.05)<br>$→$ |

-continued

| [ыцол $] | 1e-42 | ̂подьцол $ | →  |
|---|---|---|---|
| | | | p→п |
| | | | o→o |
| | | | d→дь (0.2) |
| | | | z→ц (0.05) |
| | | | o→o |
| | | | l→л |
| | | | $→$ |

Result: подзол

The above examples indicate not only operability of the proposed transliteration method, but also the potential for improving the accuracy and clarity of transliteration in automatic systems, i.e. systems operating without human intervention.

Although the claimed methods are described above by means of exemplary embodiments, these exemplary embodiments can be modified without departure from the spirit and scope of the invention, imposing no limitations on the scope of claims.

The invention claimed is:

1. A method for automatic transliteration of a record in a first language to a word in a second language, which involves the following:
   receiving a sequence of signals, each of which encodes the corresponding character in the record in the first language to be transliterated, and saving the said received signal sequence to memory;
   during stepwise analysis of the signals from the start to the end of the saved signal sequence, finding all transliteration rules for the character being analyzed or character group starting with the character being analyzed, in the record in the first language to be transliterated, by looking up in the appropriate rule base created in advance;
   complementing all the transliteration variants obtained at the previous step with characters of the second language from each transliteration rule found at the given step, thus obtaining at the given step composite variants of transliteration associated with this step or with one of the subsequent steps;
   at each step, comparing each of the aforementioned composite transliteration variants obtained at the given step against starting segments of words in the second language, by looking up in the created base of starting segments of words in the second language, and if a particular transliteration variant associated with the given step matches a starting segment of a word in the second language, retaining this transliteration variant for analysis in subsequent steps;
   on completion of the last step of the analysis, accepting at least one transliteration variant in the second language associated with the last step as the transliteration result of the said record in the first language;
   creating a sequence of signals, each of which encodes the corresponding character in the resulting transliterated word of the second language,
   wherein the said base of starting segments of words in the second language is created directly during the said comparison.

2. The method of claim 1, further comprising complementation of the said received signal sequence at its start and end with signals corresponding to preset characters, and the first step of analysis is started from the first of the said preset characters.

3. The method of claim 2, wherein the signals that complement the received signal sequence correspond to preset alphabetic characters.

4. The method of claim 2, wherein the signals that complement the received signal sequence correspond to preset non-alphabetic characters.

5. The method of claim 3, wherein the signals that complement the received signal sequence correspond to different preset characters.

6. The method of claim 3, wherein the signals that complement the received signal sequence correspond to the same preset character.

7. The method of claim 1, wherein the characters used for the record in the first language are selected from the group comprising: alphabetic characters of the first language; non-alphabetic characters, each resembling some alphabetic character of the second language; non-alphabetic characters that in combination resemble some alphabetic character of the second language.

8. The method of claim 1, wherein the said base of starting segments of words in the second language is created in advance.

9. The method of claim 7, wherein the accepted transliteration result after the last step is the variant with the highest probability.

10. The method of claim 7, wherein the logarithmic measure of probability is used as the said probability of a transliteration variant.

11. The method of claim 7, further comprising complementation of the said received signal sequence at its start and end with signals corresponding to preset characters, and the first step of analysis is started from the first of the said preset characters.

12. The method of claim 1, wherein the accepted transliteration result after the last step is the variant with the highest probability.

13. A method for automatic transliteration of a record in a first language to a word in a second language, which involves the following:
   receiving a sequence of signals, each of which encodes the corresponding character in the record in the first language to be transliterated, and saving the said received signal sequence to memory;
   during stepwise analysis of the signals from the start to the end of the saved signal sequence, finding all transliteration rules for the character being analyzed or character group starting with the character being analyzed, in the record in the first language to be transliterated, by looking up in the appropriate rule base created in advance;
   complementing all the transliteration variants obtained at the previous step with characters of the second language from each transliteration rule found at the given step, thus obtaining at the given step composite variants of transliteration associated with this step or with one of the subsequent steps;
   at each step, comparing each of the aforementioned composite transliteration variants obtained at the given step against starting segments of words in the second language, by looking up in the created base of starting segments of words in the second language, and if a particular transliteration variant associated with the given step matches a starting segment of a word in the second language, retaining this transliteration variant for analysis in subsequent steps;
   on completion of the last step of the analysis, accepting at least one transliteration variant in the second language associated with the last step as the transliteration result of the said record in the first language;

creating a sequence of signals, each of which encodes the corresponding character in the resulting transliterated word of the second language;

wherein the said base of starting segments of words in the second language is created directly during the said comparison, from chains no longer than "m" characters, which chains are obtained from actual words of the second language, and the said starting segments of words in the second language are created by mapping the said chains with a shift by one character, wherein m>1 is an integer pre-selected for the second language; during this process, the occurrence frequency in the second language is determined for each of the said chains, and the chains with occurrence frequency below a preset limit are removed.

14. The method of claim 13, further comprising determination of the probability of each particular transliteration variant associated with the given step and no more than "m" characters long, wherein said probability is determined by finding the occurrence frequency of the corresponding chain, while for each particular variant that is longer than "m" characters and is associated with the given step, its probability is determined by multiplying the occurrence frequencies of those involved said chains "m" characters long which belong to the given particular transliteration variant with overlapping upon shifting each subsequent chain "m" characters long by one character from the beginning of the given particular transliteration variant; if any of the chains is missing, the variant is discarded.

15. The method of claim 14, wherein, during determination of the said probabilities of transliteration variants, the probability calculated at a particular step of said analysis is multiplied by a pre-selected weighting factor of the rule which is used at the given step of analysis to find the transliteration variant.

16. The method of claim 14, wherein if no variant of transliteration in the second language is found upon completing the analysis for the record in the first language being analyzed, the said stepwise analysis of signals is repeated from the beginning to the end of the said saved signal sequence, and if this particular transliteration variant associated with the given step does not match any starting segment of some word in the second language, this transliteration variant is assigned a tentative occurrence frequency equal to a small preset value.

17. The method of claim 14, wherein the number of transliteration variants saved at each step of the analysis does not exceed a preset number, and wherein the said variants end in the same "m−1" characters of the second language and have higher probabilities.

18. The method of claim 13, wherein in the case that the transliteration variant comprising "k" said chains is compared to a transliteration variant comprising "q" said chains, where "k" and "q" are positive integers, the probabilities of both transliteration variants are normalized by "k" and "q", respectively, before the comparison, by extracting the k-th or q-th root, respectively, from the corresponding probability.

19. The method of claim 18, wherein, beside the number of chains, the number of rules used in each of the compared variants is taken into account by adding the number of rules used therein to "k" and "q", respectively.

20. The method of claim 14, wherein the logarithmic measure of probability is used as the said probability of a transliteration variant.

* * * * *